US008863557B2

(12) United States Patent
Milicevic et al.

(10) Patent No.: US 8,863,557 B2
(45) Date of Patent: Oct. 21, 2014

(54) METHOD FOR MANUFACTURING A PRIMARY PREFORM FOR OPTICAL FIBRES, PRIMARY PREFORM, FINAL PREFORM, OPTICAL FIBRE

(71) Applicant: Draka Comteq B.V., Amsterdam (NL)

(72) Inventors: Igor Milicevic, Helmond (NL); Johannes Antoon Hartsuiker, Eindhoven (NL); Mattheus Jacobus Nicolaas Van Stralan, Tilburg (NL)

(73) Assignee: Draka Comteq, B.V. (NL)

( * ) Notice: Subject to any disclaimer, the term of this patent is extended or adjusted under 35 U.S.C. 154(b) by 54 days.

(21) Appl. No.: 13/623,182

(22) Filed: Sep. 20, 2012

(65) Prior Publication Data
US 2013/0067960 A1 Mar. 21, 2013

(30) Foreign Application Priority Data

Sep. 20, 2011 (NL) .................................... 2007447

(51) Int. Cl.
*C03B 37/018* (2006.01)
*C03B 37/027* (2006.01)

(52) U.S. Cl.
CPC ........... *C03B 37/018* (2013.01); *C03B 37/0183* (2013.01)
USPC .................................. 65/391; 65/419; 65/436

(58) Field of Classification Search
None
See application file for complete search history.

(56) References Cited

U.S. PATENT DOCUMENTS

| 4,549,781 A * | 10/1985 | Bhagavatula et al. ........ 385/126 |
| 4,714,589 A | 12/1987 | Auwerda et al. |
| 4,741,747 A | 5/1988 | Geittner et al. |
| 4,844,007 A | 7/1989 | Eikelboom |
| 4,877,938 A | 10/1989 | Rau et al. |
| 5,145,509 A | 9/1992 | Bachmann et al. |
| 5,188,648 A | 2/1993 | Geittner et al. |
| 5,518,516 A * | 5/1996 | Garnham ........................ 65/382 |
| 6,542,683 B1 * | 4/2003 | Evans et al. .................... 385/127 |
| 7,068,899 B2 * | 6/2006 | Milicevic et al. .............. 385/123 |
| 2003/0115908 A1 * | 6/2003 | Hammerle et al. ............. 65/379 |
| 2003/0159781 A1 | 8/2003 | Van Stralen et al. |
| 2005/0172902 A1 * | 8/2005 | Van Stralen et al. .. 118/723 MW |
| 2007/0158025 A1 * | 7/2007 | Larson ..................... 156/345.26 |
| 2007/0289532 A1 | 12/2007 | Hartsuiker et al. |
| 2008/0031582 A1 * | 2/2008 | Gonnet et al. ................. 385/127 |
| 2008/0044150 A1 | 2/2008 | Terpsma et al. |
| 2008/0271494 A1 * | 11/2008 | Deckers et al. ................. 65/391 |
| 2009/0003787 A1 * | 1/2009 | Hartsuiker et al. ............ 385/124 |
| 2010/0154479 A1 * | 6/2010 | Milicevic et al. ............... 65/391 |
| 2011/0058780 A1 * | 3/2011 | Han et al. ....................... 385/124 |
| 2013/0167593 A1 * | 7/2013 | Milicevic et al. ............... 65/379 |

FOREIGN PATENT DOCUMENTS

JP 57051139 A 3/1982
WO 2004101458 A1 11/2004

OTHER PUBLICATIONS

International Search Report for NL 2007447 dated May 16, 2012.

* cited by examiner

*Primary Examiner* — Matthew Daniels
*Assistant Examiner* — Lisa Herring
(74) *Attorney, Agent, or Firm* — Shumaker, Loop & Kendrick, LLP

(57) ABSTRACT

A method for manufacturing a primary preform for an optical fiber wherein conditions are created in the reaction zone such that one or more glass layer packages made up of at least two separate glass layers are deposited on the interior of the substrate tube.

17 Claims, 7 Drawing Sheets

US 8,863,557 B2

METHOD FOR MANUFACTURING A PRIMARY PREFORM FOR OPTICAL FIBRES, PRIMARY PREFORM, FINAL PREFORM, OPTICAL FIBRE

CROSS-REFERENCE TO RELATED APPLICATION

This applications claim priority to Dutch Patent Application No. 2007447 filed Sep. 20, 2011, the entirety of which is incorporated by reference herein.

DETAILED DESCRIPTION OF THE INVENTION

The present invention relates to a method for manufacturing a primary preform for an optical fibre, using a plasma chemical internal vapour deposition process, wherein doped or undoped glass-forming precursors are supplied to the interior of a hollow glass substrate tube, a reaction zone in the form of a plasma is moved back and forth along the length of the aforesaid hollow glass substrate tube between a point of reversal near the supply side and a point of reversal near the discharge side of the hollow substrate tube, wherein the substrate tube is positioned in a furnace and wherein such conditions are created in the aforesaid reaction zone that one or more glass layer packages made up of at least two separate glass layers are deposited on the interior of the aforesaid substrate tube.

In internal vapour deposition techniques, a reaction mixture consisting of glass-forming gases and optional dopants is supplied at the supply side of a hollow glass substrate tube, after which said gases are converted into glass in a reaction zone. Unreacted gases and/or residual products are discharged via the discharge side of the hollow glass substrate tube.

In an internal vapour deposition process of the PCVD (Plasma Chemical Vapour Deposition) type, the reaction zone is a plasma which is moved back and forth along the length of the hollow glass substrate tube. In a PCVD process, glass layers are directly deposited on the interior of the hollow glass substrate tube, independently of the direction in which the reaction zone is moving. A PCVD process is known, inter alia from U.S. Pat. No. 4,741,747, U.S. Pat. No. 5,145,509, U.S. Pat. No. 5,188,648, WO 2004/101458 and US 2008/0044150.

In an internal vapour deposition process of the MCVD (Modified Chemical Vapour Deposition) or FCVD (Furnace Chemical Vapour Deposition) type, the reaction of the glass-forming gases and optional dopants is activated by heating the exterior of the hollow glass substrate tube, using a burner or a furnace, respectively. In the reaction zone, which is located near the burner or the furnace, the glass-forming gases are converted into so-called soot, which soot is deposited on the interior of the hollow glass substrate tube under the influence of thermophoresis. Soot is converted into glass by means of heating. In an MCVD or an FCVD process, glass layers are deposited only when the reaction zone is moving in the direction of the discharge side of the hollow glass substrate tube. PCVD, MCVD and FCVD processes are known in the art.

JP 57-51139 discloses an MCVD process in which a starting material for an optical fibre is produced. In a cycle, a number of glass layers are deposited on the interior of a substrate tube, with the deposition starting at a position near the supply side and the distance along which the reaction zone moves in the direction of the discharge side varying with each glass layer. The starting material is produced by carrying out a number of cycles in succession.

An optical fibre consists of a core and an outer layer surrounding said core, also referred to as "cladding". The core usually has a higher refractive index than the cladding, so that light can be transported through the optical fibre.

The core of an optical fibre may consist of one or more concentric layers, each having a specific thickness and a specific refractive index or a specific refractive index gradient in radial direction.

An optical fibre having a core consisting of one or more concentric layers having a constant refractive index in radial direction is also referred to as a (multiple) step-index optical fibre. The difference $n_i$ between the refractive index of a concentric layer and the refractive index $n_{cl}$ of the cladding can be expressed in a so-called delta value, indicated as $\Delta_i\%$ and can be calculated according to the formula below:

$$\Delta_i \% = \frac{n_i^2 - n_{cl}^2}{2n_i^2} * 100\%$$

where:
$n_i$=refractive index value of layer i
$n_{cl}$=refractive index value of the cladding An optical fibre can also be manufactured in such a manner that a core having a so-called gradient index refractive index profile is obtained. Such a radial refractive index profile is defined both with a delta value $\Delta\%$ and with a so-called alpha value $\alpha$. The maximum refractive index in the core is used for determining the $\Delta\%$ value. The alpha value can be determined by means of the formula below:

$$n(r) = n_1 \left(1 - 2\Delta \% \left(\frac{r}{a}\right)^\alpha\right)^{\frac{1}{2}}$$

where:
$n_1$=refractive index value in the centre of the fibre
a=radius of the gradient index core [µm]
$\alpha$=alpha value
r=radial position in the fibre [µm]

A radial refractive index profile of an optical fibre is to be regarded as a representation of the refractive index as a function of the radial position in an optical fibre. Likewise it is possible to graphically represent the refractive index difference with the cladding as a function of the radial position in the optical fibre, which can also be regarded as a radial refractive index profile.

The form of the radial refractive index profile, and in particular the thicknesses of the concentric layers and the refractive index or the refractive index gradient in the radial direction of the core determine the optical properties of the optical fibre.

A primary preform comprises one or more preform layers which form the basis for the one or more concentric layers of the core and/or part of the cladding of the optical fibre that can be obtained from a final preform.

A preform layer is built up of a number of glass layers. In an internal vapour deposition process, a glass layer is the layer that is deposited upon movement of the reaction zone from the supply side to the discharge side or from the discharge side to the supply side.

A final preform as referred to herein is a preform from which an optical fibre is made, using a fibre drawing process.

To obtain a final preform, a primary preform is externally provided with an additional layer of glass, which additional layer of glass comprises the cladding or part of the cladding. Said additional layer of glass can be directly applied to the primary preform. It is also possible to place the primary preform in an already formed glass tube, also referred to as "jacket tube". Said jacket may be contracted onto the primary preform. Finally, a primary preform may comprise both the core and the cladding of an optical fibre, so that there is no need to apply an additional layer of glass. A primary preform is in that case identical to a final preform. A radial refractive index profile can be measured on a primary preform and/or on a final preform.

The length and the diameter of a final preform determine the maximum length of optical fibre that can be obtained from the final preform.

To decrease the production costs of optical fibres and/or increase the yield per primary preform, the aim is therefore to produce a maximum length of optical fibre that meets the required quality standards, and that on the basis of a final preform.

The diameter of a final preform can be increased by applying a thicker layer of additional glass to a primary preform. Since the optical properties of an optical fibre are determined by the radial refractive index profile, the the layer of additional glass must at all times be in the correct proportion to the layer thickness of the preform layers of the primary preform that will form the core, more in particular the one or more concentric layers of the core, in the optical fibre. Consequently, the layer thickness of the glass layer additionally applied to the primary preform is limited by the thickness of the preform layers being formed by means of the internal vapour deposition process.

The length of a final preform can be increased by increasing the length, more in particular the usable length, of a primary preform. The term "usable length" is to be understood to be the length of the primary preform along which the optical properties remain within predetermined tolerance limits, which tolerance limits have been selected so that optical fibres that meet the desired quality standards are obtained.

To determine the usable length of the primary preform, a radial refractive index profile is measured at a number of positions along the length thereof, after which it is possible, based on said measurements, to determine a so-called longitudinal refractive index profile and a longitudinal geometry profile for each preform layer, if desired.

Thus a longitudinal refractive index profile can be considered to be a graphic representation of the refractive index of a preform layer as a function of the longitudinal position in the primary preform. It is also possible, of course, to use the refractive index difference rather than the refractive index for determining a longitudinal refractive index profile.

A longitudinal geometry profile can be understood to be a graphic representation of the cross-sectional area of a preform layer as a function of the longitudinal position in the primary preform. The cross-sectional area, also referred to as CSA, can be calculated on the basis of a radial refractive index profile. The CSA can be calculated as follows:

$$CSA_i = \frac{\pi}{4}(d_{i,u}^2 - d_{i,i}^2)$$

where
$CSA_i$=cross-sectional area of the preform layer i [mm$^2$]
$d_{i,u}$=external diameter of the preform layer i [mm]
$d_{i,i}$=internal diameter of the preform layer i [mm]

The usable length of a primary preform is in particular adversely affected by so-called "taper". The term "taper" is to be understood to be a deviation of the optical and/or geometric properties of the primary preform in regions near the ends thereof. A distinction is made between optical taper and geometric taper.

Optical taper relates to deviations of the refractive index (or the refractive index difference), whilst geometric taper relates to deviations of the cross-sectional area of the preform layer.

If a primary preform is built up of several preform layers, the optical and geometric taper of the preform layers may differ from each other.

Methods for reducing optical and/or geometric taper are known in the art.

U.S. Pat. No. 4,741,747, for example, discloses a method for manufacturing optical preforms according to the PCVD method, wherein glass layers are deposited by causing a plasma to move back and forth between two points of reversal in the interior of a glass tube, with the addition to the tube of a reactive gas mixture at a temperature ranging between 1100° C. and 1300° C. and a pressure ranging between 1 kPa and 30 kPa. By causing the plasma to move non-linearly as a function of time near at least one of the points of reversal, the magnitude of the region exhibiting non-constant deposition geometry at the ends of the optical preform is reduced.

The present inventors have found that such a method leads to a reduction of the geometric taper, to be true, but that the optical taper does not improve, or even worsens. Moreover, the present inventors have found that it is in some cases necessary to influence the refractive index of the deposited glass also at other positions outside the so-called taper regions.

Although it is thus possible, using the prior art methods, to increase the usable length of a primary preform, there is a need for a method by means of which the usable length can be increased even further.

BRIEF SUMMARY OF THE INVENTION

Accordingly it is an object of the present invention to provide a method for manufacturing primary preforms for optical fibres that have a large usable length.

Another object of the present invention is to provide a method for manufacturing primary preforms for optical fibres in which the influencing of optical taper can take place independently of geometric taper.

Yet another object of the present invention is to provide a method by which the refractive index and/or the cross-sectional area can be accurately set as desired as a function of the position in the longitudinal direction of the primary preform.

The present invention comprises the following step: defining deposition conditions as a function of the position of the reaction zone, seen in the longitudinal direction of the hollow glass substrate tube, for the deposition of at least one glass layer, with the deposition conditions thus defined differing from each other within the deposition of the aforesaid glass layer.

The present invention is based on the perception that when a final preform is drawn, the layer thicknesses of the glass layers deposited by using an internal vapour deposition process are drastically reduced in the final preform. A typical optical fibre has a diameter of 125 μm. A final preform for single mode fibres has a diameter of about 100 to 150 mm, for example, or even more. The thickness of the preform layers, and thus also the thickness of the glass layers in the final preform, are therefore reduced by a factor in the order of about 800 to 1200, or even more, during the manufacture of the optical fibre.

The present inventors have realised that the way in which the light propagates through the optical fibre is influenced by the average properties of a number of adjacent glass layers rather than by the properties of each individual glass layer. The present inventors have thus found that it is possible to build up a preform layer from glass layer packages, wherein each glass layer package consists of at least two glass layers and wherein the optical properties of at least two glass layers of the glass layer package differ from each other, without this having an effect on the propagation of the light through the optical fibre.

That is, the present inventors have found that a first fibre manufactured on the basis of a first primary preform built up of one or more preform layers, which are each in turn built up of glass layers that are identical to each other, has the same optical properties as a second fibre manufactured according to the present invention, with the average optical properties of a glass layer package in the second primary preform corresponding to the optical properties of the glass layers in the first primary preform. It is noted that the average optical properties are determined in radial direction.

Put differently, the present inventors have found that in an internal vapour deposition process in which relatively thin glass layers are deposited, not all the glass layers need to have exactly the same refractive index or the same cross-sectional area; preferably, the thickness of the individual glass layer in the optical fibre produced on the basis of the primary preform is significantly smaller than the wavelength of the light that propagates through the optical fibre, and the average refractive index of the glass layers is identical to the refractive index of a preform layer in a primary preform in which the glass layers all exhibit the same refractive index. It is furthermore desirable if the above-described aim regarding the refractive index value also applies to the cross-sectional area of the glass layers within a glass layer package that have been obtained by deposition.

Using the present invention, it is therefore possible to set the deposition conditions of the glass layers such that geometric taper is minimised whilst the optical taper is hardly influenced, if at all. Using the present invention, it is furthermore possible to set the deposition conditions of the glass layers such that optical taper is minimised while the geometric taper is hardly, if at all, influenced thereby. Put differently, using the present invention it has been found to be possible to set the optical taper and the geometric taper independently of each other. Consequently, the usable length of a primary preform can be increased in comparison with prior art methods.

The present invention provides a possibility of setting the average refractive index and/or the average cross-sectional area of a preform layer, seen in radial direction, in dependence on the position along the length of a preform. To that end the deposition conditions can be varied as a function of the position of the reaction zone. It is therefore desirable if the deposition conditions of glass layers being adjacent to each other within a glass layer package differ from each other.

More in particular it has been found to be possible to reduce local deviations from the average refractive index and/or the average cross-sectional area of a preform layer, seen in radial direction, by setting the deposition conditions as a function of the position of the reaction zone, seen in the longitudinal direction of the hollow glass substrate tube, for each of the glass layers in a glass layer package. Thus it is preferable if within a particular glass layer package the refractive index value and/or the cross-sectional area of one glass layer obtained by deposition differs from the refractive index value and/or the cross-sectional area of another glass layer obtained by deposition.

Put differently, the present invention is not limited to influencing the geometric and the optical taper but it can be used along the entire length of the primary preform.

In a special embodiment, the average refractive index value and/or the average cross-sectional area of a particular glass layer package made up of a number of individual glass layers obtained by deposition can be regarded as a combination of the refractive index value or the cross-sectional area of each individual glass layers, with the refractive index value and/or the cross-sectional area of at least two such individual glass layers in the aforesaid glass layer package differing from each other.

The present invention further provides a possibility of manufacturing a primary preform wherein the ratio of the cross-sectional areas of the various preform layers is substantially constant along the length of the primary preform, but wherein the layer thicknesses of the preform layers are not constant along the length of the primary preform. Such a primary preform may be provided with an additional glass layer in a further processing step, with the layer thickness of the additional glass layer being selected so that the ratio between the cross-sectional area of the additional glass layer and the cross-sectional area of the preform layer will be constant along the length of the primary preform. In this way a final primary preform is obtained in which the ratio between the additional layer and the preform layers is constant along the length of the final preform. The external diameter of such a final preform is usually not constant in the longitudinal direction. The aforesaid technology is also referred to as "profile overcladding". After being drawn into a fibre having a constant external diameter, a final preform produced on the basis of profile overcladding technology will result in a fibre in which the glass layer thicknesses of the concentric layers of the core and the cladding are substantially constant, seen in the longitudinal direction, which in turn will result in a fibre exhibiting substantially constant optical properties, seen in the longitudinal direction.

Thus, at least one of the aforesaid objects is achieved.

In a preferred embodiment, the glass layers of a glass layer package each have a thickness, seen in radial direction, which ranges from 0.1 μm to 10 μm, preferably from 0.5 μm to 5 μm.

In another preferred embodiment, the number of glass layers of which a glass layer package is made up ranges from 2-100, preferably from 2-50 and more preferably from 4-30. A relatively high number of glass layers makes it possible to realise a precise control of the average optical properties of the glass layer package. A low number of glass layers is relatively easy to control, but imposes limits as regards the possibilities of setting the average optical properties of the glass layer package. A process that is readily controllable in practice can be carried out by using a glass layer package comprising about 10-20 glass layers.

The number of glass layers of a glass layer package is preferably set so that the following condition is met:

$$N \leq 0.1 * \frac{\lambda * Q_{final}}{d * Q_{fibre}}$$

where:
N=the number of glass layers in a glass layer package [-]
λ=the minimum wavelength used of the optical fibre [μm]

d=the thickness of a glass layer in a glass layer package of a primary preform [μm]

$Q_{final}$=the diameter of the final preform produced on the basis of the primary preform [mm]

$Q_{fibre}$=the diameter of the optical fibre [mm].

Defining the deposition conditions preferably comprises the setting of one or more process parameters selected from the group of: the amount of additional gas to be metered at the supply side, the velocity of the reaction zone, the intensity of the plasma of the reaction zone and the length of the reaction zone. The term "amount" is to be understood in particular to mean the flow, viz. the quantity per unit time.

It is noted that the direction of movement of the reaction zone must not be regarded as a deposition condition.

In a special embodiment of the present invention it is thus possible to subdivide the deposition length, viz. the length of the substrate tube along which the reaction zone is moved between the two points of reversal, into separate deposition regions, wherein the respective deposition condition is determined for each deposition region. In particular it obtains that the deposition condition determined for a deposition region is adjustable during the deposition process.

Supplying the additional gas preferably takes place in the form of one or more pulses having a pulse length and a pulse height. The dopants are added to the reaction mixture. A suitable device for this embodiment is described in EP 2 199 263. Using said device, a main gas flow of glass-forming gases, optionally comprising an amount of dopants, is supplied at the supply side of the hollow glass substrate tube. An additional amount of dopants can be supplied in a subsidiary gas flow. The present invention can thus be used by adding pulses of additional dopant to the main gas flow, for example.

The pulse length is preferably kept relatively short so as to be able to set the refractive index of the glass layer, seen in longitudinal direction, as precisely as possible. The pulse height then determines the extent to which the refractive index is influenced. Preferably, the pulse length ranges between 1 ms and 500 ms, more preferably between 1 ms and 200 ms, even more preferably between 5 ms and 100 ms.

Although the device according to EP 2 199 263 relates to the pulsed supply of additional gases, the method according to the present invention is not limited thereto. It is also possible, for example, to use a flow controller, such as a mass flow controller.

The additional gas may be a gas that increases or decreases the refractive index. Moreover, the present invention is not limited to the use of a single dopant; it is also possible to use a combination of dopants. The dopants used may furthermore vary with each glass layer of glass layer package. Suitable dopants are, for example, $GeCl_4$, $PO_2Cl_5$, $N_2CF_4$, $SiF_4$, $C_2F_6$, $C_4F_8$, $CCl_2F_2$, $SiF_4$, $Si_2F_6$, $SF_6$, $NF_3$ and $F_2$.

By setting the amount of dopant along the length of the primary preform it is possible to obtain a desired longitudinal refractive index profile. If necessary, the velocity of the reaction zone can also be set as a function of the position so as to influence the thickness of the glass layer in longitudinal direction. Thus it is also possible to influence the geometric paper.

The additional gas may also be a gas that does not directly have a refractive index-increasing or a refractive index-decreasing effect, but by means of which such an effect can be obtained indirectly. Examples of such gases are $O_2$, Ar and He. Said gases, when supplied to the reaction zone, will have an effect on the intensity of the plasma, the result being that the incorporation efficiency of dopants can be increased or decreased, as the case may be. Furthermore, the total amount of deposited glass, and thus the layer thickness of a glass layer, can be influenced to some extent.

For reasons of controllability of the deposition process it is preferable to use only one additional gas in the method according to the invention. It is noted that the gases that are additionally supplied for setting the average refractive index in radial direction of a glass layer package may or may not be cumulative to a basic amount of dopants already being supplied to the hollow glass substrate tube as a constant flow together with the other glass-forming gases.

Defining the glass layer package preferably further comprises setting a deposition length for each glass layer. The deposition length is to be considered to be the distance between a point of reversal of the reaction zone near the supply side and a point of reversal of the reaction zone near the discharge side of the hollow glass substrate tube. Setting the deposition length can thus be done by setting the position of the points of reversal of the reaction zone for the glass layers of a glass layer package. Varying the deposition length is one possibility for influencing the layer thickness of the glass layer package near the supply side and/or the discharge side. Preferably, the deposition length at the supply side is reduced by no more than the length of the plasma. Furthermore preferably, the deposition length at the discharge side is reduced by no more than the length of the plasma. The length of the plasma in a PCVD process is about 5 cm-60 cm, preferably 15 cm-25 cm. It is noted that setting the deposition length must not be construed as defining the deposition conditions.

The reaction zone is preferably a plasma generated by means of microwaves, it preferably moves back and forth in the longitudinal direction of the hollow glass substrate tube, between the two points of reversal, at an average velocity ranging between 2 m/min-40 m/min, preferably 15 m/min-25 m/min.

The primary preform preferably comprises at least one preform layer, which preform layer is at least in part built up of glass layer packages, wherein the preform layer has a substantially constant average refractive index, seen in radial direction. The principle of the present invention applies both to preform layers having a constant (average) refractive index, referred to as "step index" preform layers, and to preform layers having a non-constant refractive index. For example, the present invention can also be used in the manufacture of preforms for optical fibres having a core of the gradient index type, or a core having a triangular refractive index profile.

If a primary preform comprises several different preform layers, the glass layer packages of which said different preform layers are built up may differ from each other. A first preform layer may for example be built up of glass layer packages comprising ten glass layers, whilst a second preform layer is built up of glass layer packages comprising sixteen glass layers.

The present invention further relates to a method for manufacturing a final preform for an optical fibre, comprising the following steps:

i) manufacturing a primary preform according to the present invention;

ii) contracting the primary preform obtained in step i) into a solid primary preform under the influence of a heat source, iii) optionally applying an additional amount of glass to the outer side of the solid primary preform obtained in step ii) so as to form the final preform.

Subsequently an optical fibre can be produced by heating one end of the final preform and drawing the optical fibre therefrom. Methods for drawing optical fibres are known in the art.

The present invention further relates to the primary preform obtained by means of the present method, the subsequently produced final preform and the optical fibres to be obtained therefrom.

BRIEF DESCRIPTION OF THE DRAWINGS

The present invention will now be explained in more detail by means of example with reference to a number of figures, in which regard it should be noted, however, that the present invention is by no means limited thereto.

DETAILED DESCRIPTION OF THE INVENTION

Figure 1:
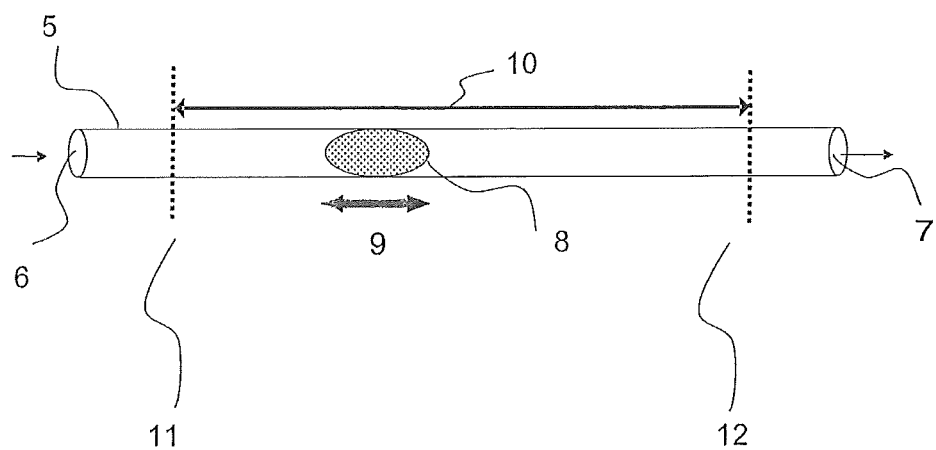
FIG. 1 schematically shows a plasma chemical internal vapour deposition process.

FIG. 1 schematically shows an internal vapour deposition process for manufacturing a primary preform for optical fibres. A hollow glass substrate tube 5 has a supply side 6 and the discharge side 7. The supply side 6 and the discharge side 7 can be positioned between a gas inlet and a gas outlet, respectively (not shown). The supply side 6 and the discharge side 7 can be clamped down, for example by means of a cylindrical passage provided with an O-ring seal, so that the internal volume of the hollow glass substrate tube 5 is isolated from the outside atmosphere. Such a construction makes it possible to carry out an internal vapour deposition process at a reduced pressure when a pump (not shown) is connected to the gas outlet. The reaction mixture containing the glass-forming gases and optional dopants is supplied at the supply side 6 during the vapour deposition process. Any additional dopants that are supplied in the method according to the present invention may either be supplied directly at the supply side 6 or be mixed with the reaction mixture prior to being supplied.

In FIG. 1 there is furthermore shown a reaction zone 8, which reaction zone 8 moves back and forth during the internal vapour deposition process between a point of reversal 11 located near the supply side 6 and a point of reversal 12 located near the discharge side 7. The reaction zone 8 has a length 9, seen in the longitudinal direction of the substrate tube 5, which is relatively small in relation to the deposition length. For a PCVD process, the length 9 is about 5 cm-60 cm.

The distance between the two points of reversal is the deposition length 10, which deposition length 10 corresponds to the length along which glass layers are deposited on the interior of the hollow glass substrate tube 5. In a PCVD type internal vapour deposition process, at least the deposition length 10 and the two points of reversal may be surrounded by a furnace (not shown), which is set at a temperature of about 800° C.-1300° C., preferably 950° C.-1100° C.

During the internal vapour deposition process, a gas mixture of doped or undoped glass-forming gases is supplied via the supply side 6 of the hollow glass substrate tube 5, which glass-forming gases are converted into glass in the reaction zone 8. Using the back and forth movement of the reaction zone 8 between the points of reversal 11 and 12, a number of glass layers 3 (see FIGS. 3 and 4) are thus deposited on the interior of the hollow glass substrate tube 5.

The present invention relates to an internal vapour deposition process of the PCVD type, in which microwaves are coupled into the interior of a hollow glass substrate tube 5 via a resonance space, also called resonator, which partially surrounds the hollow glass substrate tube 5, seen in longitudinal direction, so as to form a reaction zone 8, viz. a plasma. The length 9 of the reaction zone 8 depends in particular on the construction of the resonator and the process settings. The ratio between the length 9 of the reaction zone and the length of the resonator, seen in longitudinal direction, is about 0.5-3.

In a PCVD process, the resonance space is moved back and forth along the length of the hollow glass substrate tube between the points of reversal 11 and 12. Resonators are known in the art, for example from U.S. patent applications published under Nos. US 2007/0289532, US 2003/0159781 and US 2005/0172902, and U.S. Pat. No. 4,844,007, U.S. Pat. No. 4,714,589 and U.S. Pat. No. 4,877,938. The PCVD process is a so-called low-pressure process, by which is meant that the pressure during the internal vapour deposition process is set at a value in the 1-40 mbar range, preferably in the 5-30 mbar range.

Figure 2:
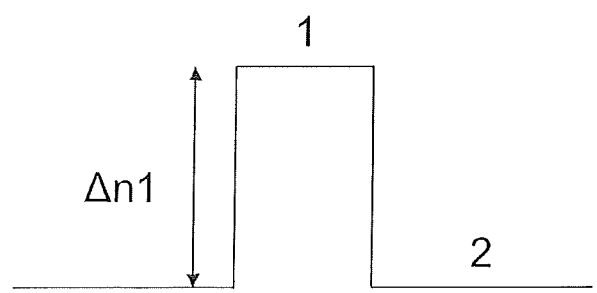
FIG. 2 schematically shows a radial refractive index profile of a step index optical fibre.
Figure 3:
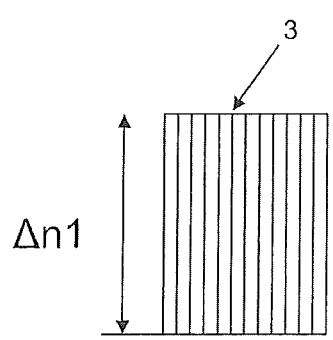
FIG. 3 shows a part of a radial refractive index profile of a step index optical fibre according to the prior art.

In FIG. 2 a radial refractive index profile of a contracted primary preform for an optical fibre is schematically shown. The primary preform comprises a core 1 and a cladding 2. The refractive index difference between the core 1 and the cladding 2 is represented as $\Delta n1$. The core 1 and the cladding 2 both have a constant refractive index value, seen in radial direction. Thus, a primary preform for a step index type of optical fibre is provided. Upon manufacture of a primary preform according to FIG. 2, the cladding 2 comprises a substrate tube 5 and possibly one or more additional preform layers (not shown). With reference to FIG. 3, the core 1 and any additional preform layers must be considered to be preform layers which are made up of several glass layers 3. The glass layers 3 are deposited upon back and forth movement of the reaction zone 8 during the internal vapour deposition process. It is noted that the substrate tube 5 in the primary preform must not be considered to be preform layer.

FIG. 3 is a schematic representation of a part of the core 1 and the cladding 2 of a contracted primary preform manufactured according to the prior art, in which the deposited glass layers 3 of the core 1 are schematically shown. Each glass layer 3 of the core 1 exhibits the same refractive index difference $\Delta n1$ with the cladding 2. Because each glass layer 3 exhibits a refractive index difference $\Delta n1$ with the cladding 2, the average refractive index difference of the core 2 equals $\Delta n1$, therefore.

Figure 4:
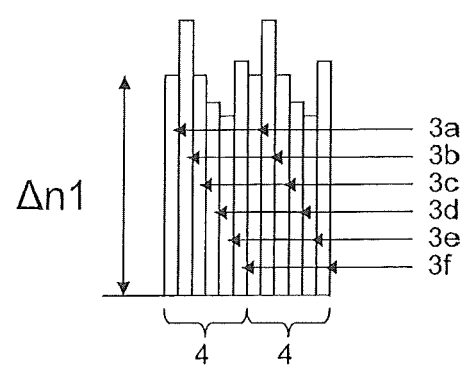
FIG. 4 shows a part of a radial refractive index profile of a step index optical fibre according to the present invention.

FIG. 4 is a schematic representation of a part of the core 1 and the cladding 2 of a contracted primary preform manufactured according to the present invention, in which the glass layers 3a-3f deposited in the internal vapour deposition process are schematically shown. During the manufacture of the primary preform according to FIG. 4, at least two glass layer packages 4 have successively been deposited on the interior of the substrate tube 5. The glass layer package 4 consists of the glass layers 3a, 3b, 3c, 3d, 3e and 3f. The refractive index difference of the layers 3b, 3d, 3e and 3f does not equal $\Delta n1$. However, the average refractive index of the glass layer package 4 does equal $\Delta n1$.

Thus, the primary preform of FIG. 3 and the primary preform of FIG. 4 each comprise a core 5, which cores exhibit the same average refractive index difference $\Delta n1$ with the cladding. The number of glass layers and glass packages shown in FIG. 4 must not be construed as being limitative.

The present inventors assume that if the primary preforms according to FIGS. 3 and 4 are processed into optical fibres, no measurable difference in optical properties between the optical fibres can be observed if the thickness of the glass layers is sufficiently small.

The present inventors assume, without wishing to be bound thereto, that there are a number of reasons for this.

In the first place, the layer thickness of a glass layer 3 in a primary preform is reduced many times during the processing of the primary preform into an optical fibre. Layer thicknesses of glass layers 3 for a PCVD type of process range between 0.1 μm and 10 μm per glass layer. A final preform has an external diameter, depending on the type of optical fibre being manufactured, that ranges between 50 mm and 200 mm, so that the layer thickness of glass layers 3 in the primary preform is reduced by a factor of 400 to 1600, respectively. The consequence of this for primary preforms manufactured by means of a PCVD process is that the layer thickness of the glass layer 3 in the optical fibre will be many times smaller than the wavelength of the light that propagates through the fibre, so that said light is influenced by a relatively large number of glass layers being adjacent to each other and not so much by the individual glass layers.

An optical fibre is mainly used in the wavelength range between about 850 nm and 1700 nm. A typical optical fibre further has a diameter of about 125 μm, more in general the diameter is in the 80 μm-250 μm range.

The present inventors assume that, in addition to the effect of the layer thickness of the glass layer 3, dopants present in a glass layer 3 diffuse slightly to adjacent glass layers 3 during the processing of the primary preform into an optical fibre. The result of this is that the differences in the refractive index between adjacent glass layers 3 are slightly reduced.

Figure 5:
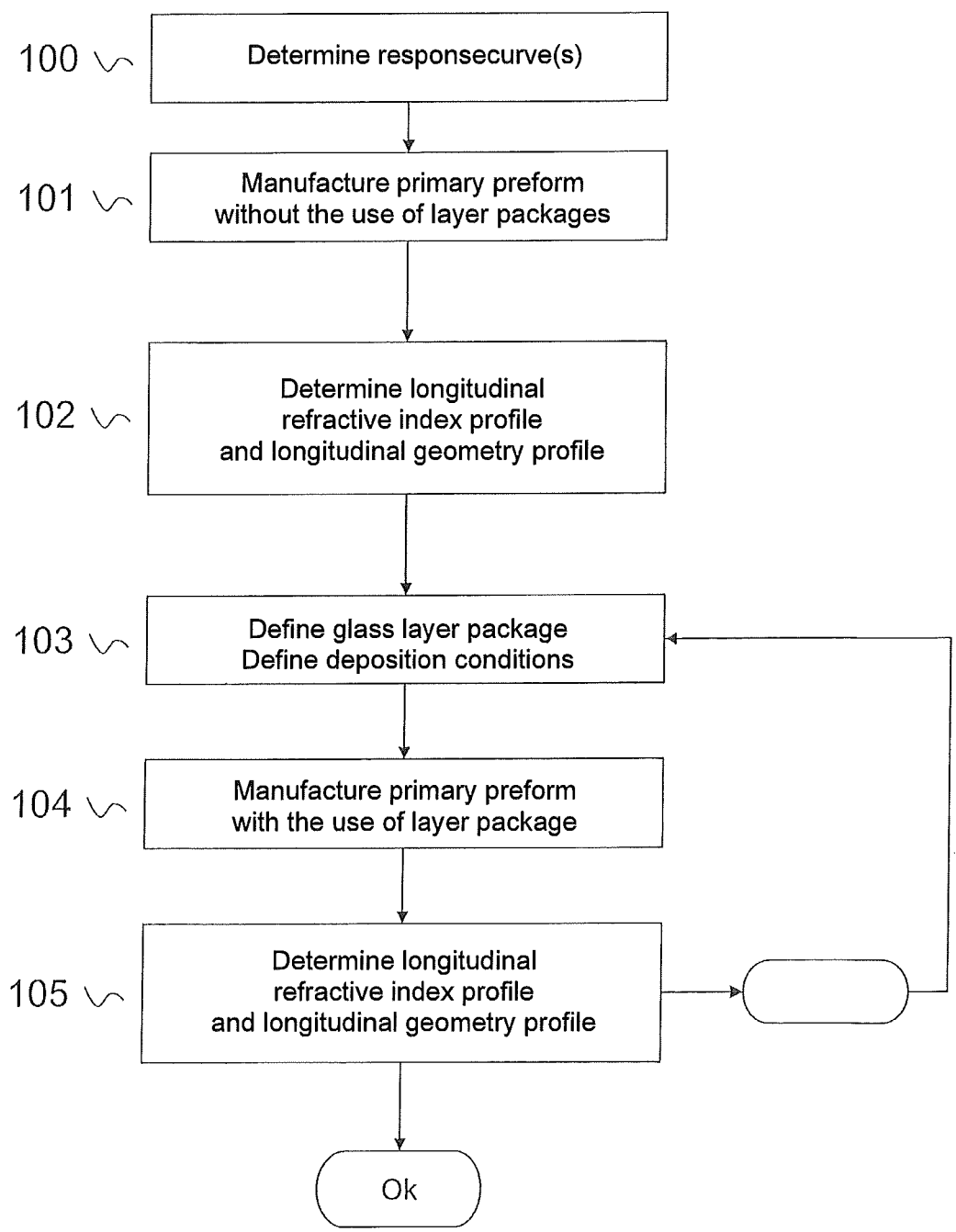
FIG. 5 shows an embodiment of an implementation of the method according to the present invention.

In FIG. 5 it is schematically set forth how the method according to the present invention can be implemented in a production process for the manufacture of primary preforms for an optical fibre. It is noted that the present invention is not limited to this implementation.

In a first step 100, so-called response curves are determined. A response curve is a graphic representation of the way in which the refractive index of a deposited glass layer 3 responds in the longitudinal direction of the substrate tube 5 when the deposition conditions at a particular position are changed in comparison with the deposition conditions along the remaining part of the deposition length 10.

Figure 6:
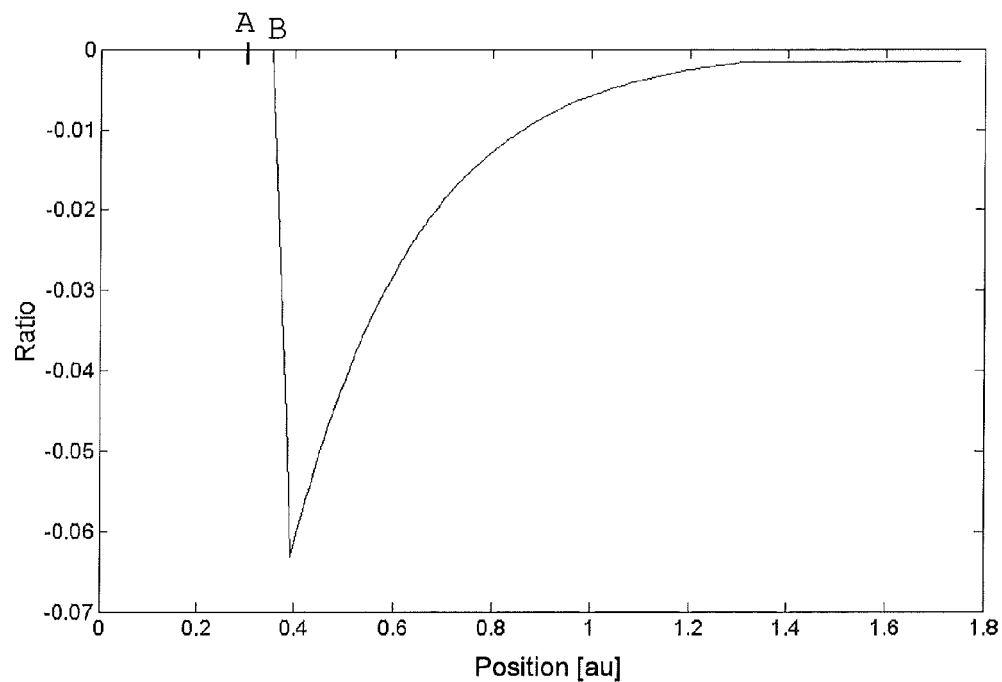
FIG. 6 shows an example of a response curve.

An example of such a response curve is shown in FIG. 6. Plotted on the horizontal axis is the position of the reaction zone expressed in arbitrary units [au]. Plotted on the vertical axis is the ratio between the refractive index of the deposited glass and the refractive index of pure quartz glass. This manner of representation is by no means limitative to the present invention. The response curve of FIG. 6 can be obtained by means of an internal deposition process in which during the deposition of a preform layer an additional amount of $C_2F_6$ is added to the reaction mixture in a pulsed manner at a position A with movement of the reaction zone 8 in the direction of the discharge side 7. When the reaction zone moves in the direction of the supply side 6, no additional amount of gas is supplied. Preferably, the primary preform is contracted after completion of the deposition process. Subsequently, the longitudinal refractive index profile of the preform layer 4 is determined, which corresponds to the response curve of FIG. 6, as can be observed in FIG. 6, the refractive index decreases practically in steps from a position B, after which the refractive index gradually increases again.

Although the pulse with the additional amount of $C_2F_6$ is added at position A, the effect is only visible from position B. The reason for this is the fact that the gas inlet is removed relatively far from the reaction zone. It can furthermore be observed that in spite of a pulsed amount of $C_2F_6$ being supplied, the refractive index does not exhibit a pulse-shaped variation, or less so. This is caused, inter alia, by the direction of flow and the flow rate of the reaction mixture and the direction of movement and the velocity of the reaction zone 8. In the case of a lower velocity of movement of the reaction zone 8, the distance between A and B will become smaller, and the increase of the refractive index will take place more rapidly.

It is noted that the response curve according to FIG. 6 is determined by the addition of a pulsed amount of $C_2F_6$ upon movement of the reaction zone 8 in the direction of the discharge side. Depending on the type of process and the manner in which the present invention is used, it may also be desirable to determine response curves upon movement of the reaction zone in the direction of the discharge side and/or to determine response curves wherein a pulsed amount of dopant is supplied both upon movement in the direction of the discharge side and upon movement in the direction of the supply side. Moreover, response curves can also be determined for other dopants and, in addition, the pulse size and the pulse length can be set.

Figure 7:
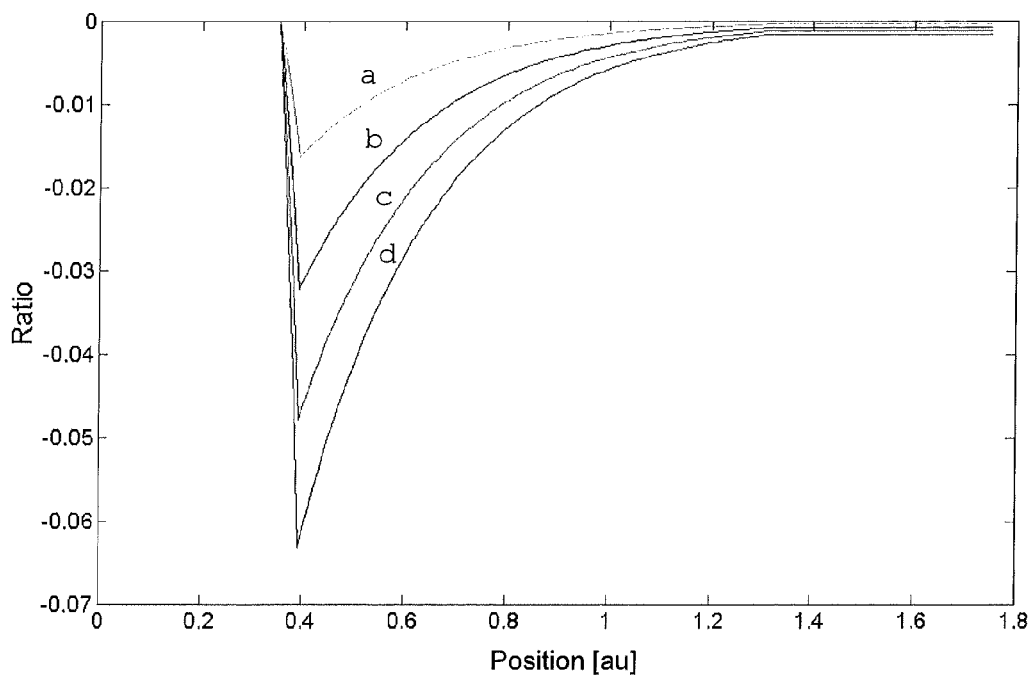
FIG. 7 shows an example of a few response curves.

In FIG. 7 a number of response curves are shown, each curve corresponding to a particular amount of additional $C_2F_6$ supplied in a pulsed manner. Four response curves a, b, c and d were obtained on the basis of four different additional amounts of $C_2F_6$. The additional amount of $C_2F_6$ for curve a was lowest, the additional amount of $C_2F_6$ for curve d was highest. Thus it is possible to determine the influence of the magnitude of the additional pulsed amount of $C_2F_6$ on the refractive index reduction and the refractive index variation.

The response curves shown in FIGS. 6 and 7 have been obtained on the basis of experiments with $C_2F_6$ as a dopant supplied in the form of pulses having a specific pulse height and pulse width. Other factors that influence the response curve, such as, inter alia, the direction of flow and the flow rate of the reaction mixture, the direction of movement, the velocity and the length of the reaction zone, were kept the same. The present invention is not limited thereto, however. In principle it is possible to determine response curves for any type of dopant, both refractive index-increasing and refractive index-decreasing, and for any manner of addition, whilst the other factors that have an influence can be freely set.

In a second step 101, a primary preform according to the prior art must be manufactured. The primary preform may be contracted into a solid rod, if desired, after which the longitudinal refractive index profile and the longitudinal geometry profile are determined in step 102.

Based on the longitudinal refractive index profile and the longitudinal geometry profile determined in step 102, and based on the previously determined response curve(s), a layer package 4 for the manufacture of next primary preforms is defined in step 103, with corrections being made for deviations of the refractive index and/or the geometry values from a desired value.

The correction of the refractive index is carried out by changing the deposition conditions, in particular the amount of dopant in the reaction mixture, in dependence on the position of the reaction zone 8. Depending on the extent of the deviation(s), a larger number of glass layers 3 in a glass layer package 4 may be needed in order to obtain the desired result.

The correction of the geometry, in particular the layer thickness of the preform layer, can be corrected by setting the velocity of the reaction zone 8 as a function of the position. Usually, a lower velocity of the reaction zone 8 will result in a thicker glass layer, and the thickness of a glass layer will decrease when a higher velocity is set. The glass layer package 4 and the associated deposition conditions are thus defined in step 103.

Figure 8:
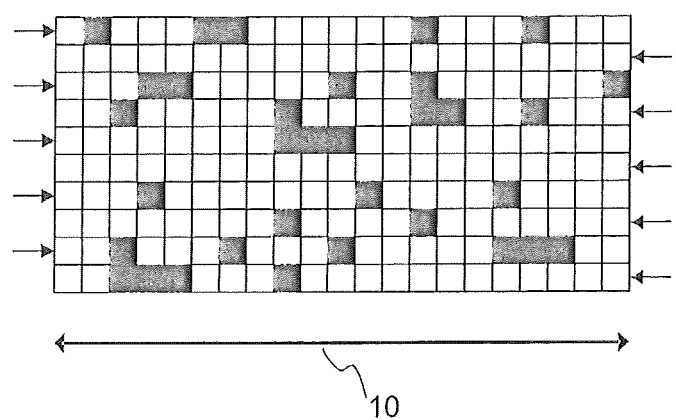
FIG. 8 schematically shows a preferred embodiment of the method according to the present invention.

In a practical embodiment, the defining of the glass layer package 4 and the associated deposition conditions for correcting the longitudinal refractive index profile results in a so-called matrix. An example of such a matrix is shown in FIG. 8. In FIG. 8, the deposition length 10 is subdivided into a number of deposition regions, but the number of said deposition regions may be even larger or smaller. In FIG. 8 twenty-one deposition regions are shown but the number of deposition regions may be larger or smaller. In a preferred embodiment, the deposition length 10 is divided into 10-100 deposition regions, furthermore preferably 20-50 deposition regions. Such a subdivision into pre-defined deposition regions is practical, but not necessary. Subsequently, the number of glass layers 3 of the glass layer package 4 is defined, said number of glass layers being ten in the embodiment of FIG. 8. The arrows on the left-hand side and the right-hand side of the matrix indicate the direction of movement of the reaction zone. The reaction zone for a first glass layer 3 of the glass layer package 4 thus moves from the supply side 6 to the discharge side 7 (from the left to the right in FIG. 8). Subsequently, the reaction zone for the second glass layer 3 of the glass layer package 4 moves from the discharge side 7 to the supply side 6, etc. The first, third fifth, i.e. the odd line numbering in FIG. 8 refers to the movement of the reaction zone from left to right, that is from the supply side to the discharge side. The even line numbering in FIG. 8 (that is lines two, four six etc) refers to the movement of the reaction zone from right to left, that is from the discharge side to the supply side. In a preferred embodiment of the present method the ■ (black area) in the matrix appear only in the odd line numbering, whereas the G appear in the even line numbering. This means that the process conditions only in the movement from left to right, i.e. from supply to discharge side, are adjusted. In such a preferred embodiment for example only an additional amount of $C_2F_6$ is added to the reaction mixture in pulses during the deposition of the "odd glass layers", whereas in the movement of the reaction zone from discharge side to the supply side no additional amount of $C_2F_6$ is added to the reaction mixture.

According to FIG. 8, depending on the position of the reaction zone, an additional amount of $C_2F_6$ is added to the reaction mixture in pulses. Such a pulse is indicated ■ (black area) in the matrix, whilst G means that no additional amount of $C_2F_6$ is supplied. Thus it has been found to be possible to subdivide the deposition length, i.e. the length of the substrate tube along which the reaction zone is moved between the two points of reversal, into separate deposition regions, for each of which deposition region the respective deposition conditions are determined, wherein in particular the deposition condition that has been determined for a deposition region can be set during the deposition process.

It is noted that the matrix of FIG. 8 relates to the addition of pulses of $C_2F_6$, so that corrections can be made when the refractive index value is too high. It is also possible, however, to define one or more matrices on the basis of pulses of a refractive index-increasing dopant, such as $GeCl_4$, or of gases that do not directly affect the refractive index, such as oxygen or argon. Finally, it is also possible to produce similar matrices for other deposition conditions as recited in the sub claims, such as, for example, the velocity and the power of the reaction zone. Using the present invention, several matrices can thus be gone through simultaneously, and the properties of a glass layer 3 in the glass layer package 4 will be influenced simultaneously in a number of different manners. For process control reasons it is preferable to carry out the present method with maximally two variables, i.e. two kinds of deposition conditions.

It is noted that step 100 on the one hand and steps 101 and 102 on the other hand are independent of each other and can be carried out in random order, therefore.

After the glass layer package 4 and the deposition conditions in a glass layer 3 have been defined, a next primary preform is manufactured in step 104, using the glass layer package 4 and the associated deposition conditions defined in step 104. Of said primary preform, the longitudinal refractive index profile and the longitudinal geometry profile are determined in step 105, optionally after contraction thereof into a solid primary preform. If the longitudinal refractive index profile and the longitudinal geometry profile meet the requirements made thereof, further primary preforms can subsequently be manufactured, using the already defined glass layer package. If the longitudinal refractive index profile and/or the longitudinal geometry profile do not or not sufficiently meet the requirements made thereof, the previously defined glass layer package can be adapted, extended or replaced, which means that steps 103, 104 and 105 will be carried out again.

COMPARATIVE EXAMPLE

Figure 9:
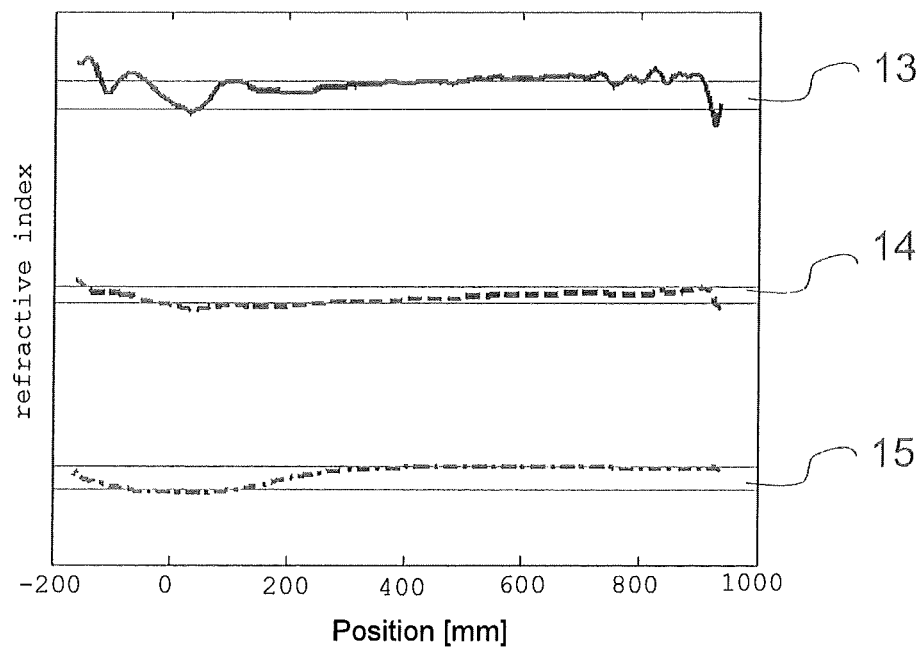
FIG. 9 shows a longitudinal refractive index profile of a primary preform manufactured according to the prior art.

FIG. 9 shows a longitudinal refractive index profile of a primary preform manufactured according to the prior art, using a PCVD process. The position along the length of the primary preform is plotted on the horizontal axis, whilst the refractive index is plotted on the vertical axis. The primary preform according to the comparative example has three preform layers, viz. a preform layer 13 having a high refractive index, which will form the core in the fibre, a preform layer 14 and a preform layer 15. Two horizontal lines are shown around the refractive index value of each preform layer 13, 14 and 15, which lines correspond to the tolerance limits for the refractive index of the preform layer.

The measurements of the refractive index of the preform layers of the primary preform according to the comparative example start at a position of about −175 mm and end at a position of about 950 mm.

As can be observed in said figure, the refractive index of in particular the preform layer 13 is not within the tolerance limits along part of the length. As a result, the usable length of the primary preform according to the comparative example as regards the refractive index is limited to the part of the length between the positions of about −20 mm and 800 mm, or even lower. The result of this is that the usable length of the primary preform according to the comparative example is at most about 820 mm. The numbers used in FIG. 9 are given by way of illustration and must not be construed as being limitative.

Figure 10:
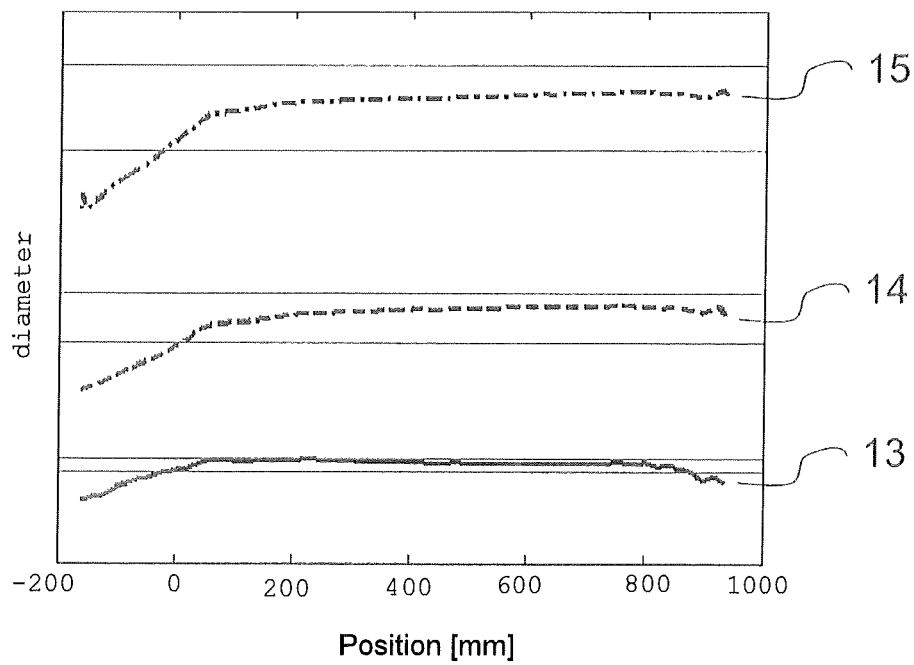
FIG. 10 shows a longitudinal geometry profile of a primary preform manufactured according to the prior art.

FIG. 10 shows a longitudinal geometry profile of the primary preform according to the comparative example. The position along the length of the preform is plotted on the horizontal axis, whilst the diameters of the preform layers are plotted on the vertical axis. The diameters of the preform layers 13, 14 and 15 are shown as a function of the position in the primary preform. Two horizontal lines are shown around the diameter value of each preform layer 13, 14 and 15, which lines correspond to the tolerance limits for the diameter of the preform layer.

As can be observed in said figure, the diameter of in particular the preform layer 14 is not within the tolerance limits along part of the length. As a result, the usable length of the primary preform according to the comparative example as regards the geometric properties is limited to the part of the length between the positions of about 0 mm and 1125 mm.

Since the usable length of the primary preform according to the comparative example was already limited on account of the refractive index between the positions −20 mm and 800 mm, the usable length of the primary preform according to the comparative example will be limited to the part of the length between the positions 0 mm and 800 mm. Put differently, the usable length of the primary preform according to the comparative example is about 800 mm.

EXAMPLE

Figure 11:
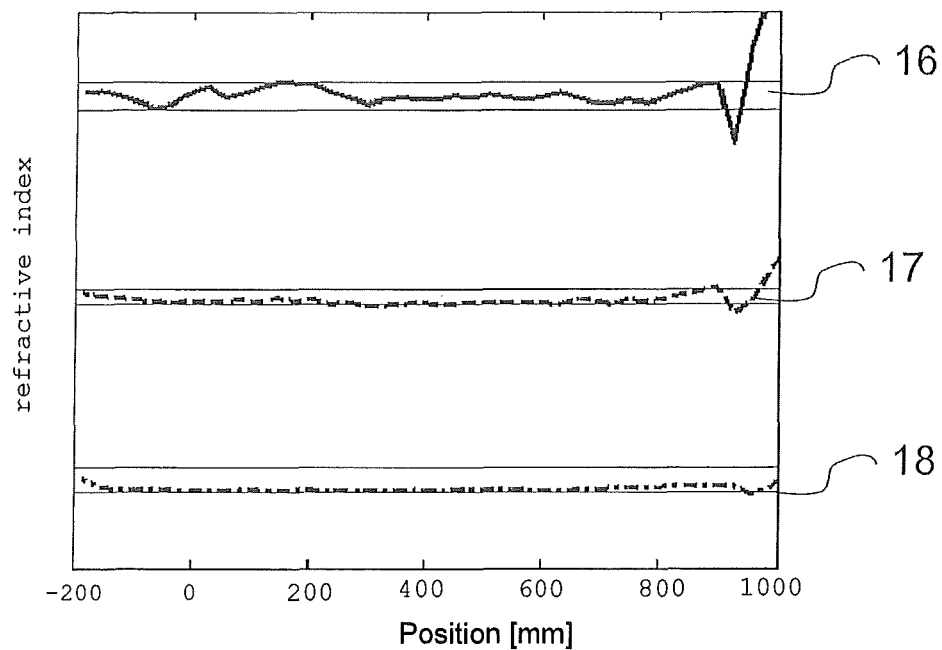
FIG. 11 shows a longitudinal refractive index profile of a primary preform manufactured according to the present invention.

FIG. 11 shows a longitudinal refractive index profile of a primary preform manufactured according to the present invention. Apart from the fact that the method according to the present invention was used, all other conditions during the manufacture of the primary preform were the same as those used during the manufacture of the primary preform according to the comparative example.

In the method according to the present invention, response curves for pulsing with $C_2F_6$ corresponding to the curves in FIGS. 6 and 7 were determined.

Based on the longitudinal refractive index profile and the longitudinal geometry profile of the comparative example, a matrix for a glass layer package 4 consisting of 10 glass layers was then defined. Said matrix consisted of 20 deposition regions. Subsequently, the primary preform according to the example was manufactured, using the present invention.

The position along the length of the primary preform is plotted on the horizontal axis, whilst the refractive index is plotted on the vertical axis. The primary preform according to the example comprises three preform layers, viz. a preform layer 16 having a high refractive index, which will form the core in the fibre, a preform layer 17 and a preform layer 18. Two horizontal lines are shown around the refractive index value of each preform layer 16, 17 and 18, which lines correspond to the tolerance limits for the refractive index of the preform layer. Said tolerance limits are the same as the limits in the comparative example.

The measurements of the refractive index of the preform layers of the primary preform according to the example start at a position of about −180 mm and end at a position of about 1000 mm. The length of the primary preform is thus about 1180 mm. Said length is slightly greater than the length of the primary preform according to the comparative example, but it cannot be definitely attributed to the effects of the present invention.

FIG. 11 shows that the refractive index of all the preform layers fall within the tolerance limits along substantially the entire length of the primary preform. Only from a position of about 900 mm does the refractive index of the preform layer 16 no longer meet the specification. As a result, the usable length of the primary preform according to the example as far as the refractive index is concerned ranges between the positions −180 mm and 900 mm.

Figure 12:
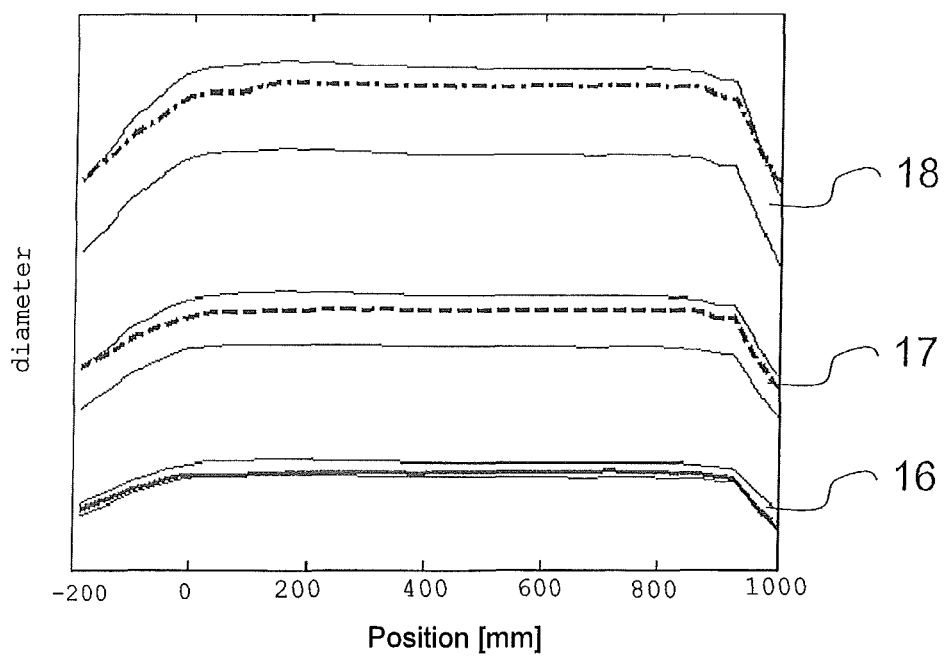
FIG. 12 shows a longitudinal geometry profile of a primary preform manufactured according to the present invention.

FIG. 12 shows a longitudinal geometry profile of the primary preform according to the invention. The position along the length of the preform is plotted on the horizontal axis, whilst the diameters of the preform layers 16, 17 and 18 are plotted on the vertical axis. The diameters of the preform layers 16, 17 and 18 are shown as a function of the position in the primary preform. Two horizontal lines are shown around the diameter value of each preform layer 16, 17 and 18, which lines correspond to the tolerance limits for the diameter of the preform layer. It is noted that the tolerance limits at the ends of the primary preform exhibit a decrease. This is a conscious setting, in which the proportions of the cross-sectional areas of the various preform layers 16, 17 and 18 are kept constant along the length of the primary preform. Such a primary preform is provided with an additional layer of glass in a further step for the purpose of forming a final preform, wherein the layer thickness of said additional layer of glass is selected so that the proportion between the cross-sectional area of the additional layer of glass and a cross-sectional area of the preform layers is constant along the length of the final preform. The skilled person will appreciate that the consequence will be that such a final preform will not have a constant diameter along the length thereof. The optical fibre that is obtained after the drawing of the final preform will exhibit constant geometric properties, seen in longitudinal direction.

The diameters of all the preform layers 16, 17 and 18 fall within the tolerance limits along the entire length of the primary preform according to the example. As a result, the usable length of the primary preform according to the example is not limited by geometric properties, as a consequence of which the usable length of the primary preform according to the example is about 1080 mm, which is an improvement of about 35% over the comparative example.

The primary preform according to the example has been manufactured on the basis of the method according to the present invention, using the profile overcladding technology. The present invention is not limited to said combination, however. Another option may be to manufacture a primary preform in which the diameter(s) of the preform layer(s) is/are constant along the length of the primary preform. The combination of the method according to the present invention with the profile overcladding technology provides greater flexibility in the manufacture of a primary preform, which may be desirable in particular if a primary preform comprising three or more preform layers is to be manufactured, i.e. primary preforms having a relatively complex radial refractive index profile.

It is further noted that although the present invention is in particular aimed at obtaining a substantially constant average refractive index, and preferably also a substantially constant layer thickness of the glass layer package, seen in longitudinal direction, it is also conceivable to use the present invention in different ways.

The present invention can also be used, for example, for producing optical fibres exhibiting a controlled and desired taper of optical and/or geometric properties. Thus, the velocity of the reaction zone and the amount of dopant can for example be set so that the average refractive index and/or the thickness of a glass layer package will decrease in a particular longitudinal direction.

In another example, the primary preform can be considered to be built up of segments in the longitudinal direction, wherein each segment has a specific radial refractive index profile, which radial refractive index profile is constant across the width of the segment, but wherein the radial refractive index profiles of two adjacent segments are different from each other. In this way it is possible, for example, to produce a fibre comprising segments exhibiting an alternating sign for the chromatic dispersion.

What is claimed is:

1. A method for manufacturing a primary preform for an optical fibre, using a plasma chemical internal vapour deposition process, wherein doped or undoped glass-forming precursors are supplied to the interior of a hollow glass substrate tube, a reaction zone in the form of a plasma is moved back and forth along the length of the hollow glass substrate tube between a point of reversal near a supply side and a point of reversal near a discharge side of the hollow substrate tube, wherein the substrate tube is positioned in a furnace and wherein such conditions are created in the reaction zone that one or more glass layer packages made up of at least two separate glass layers are deposited on the interior of the substrate tube, the method comprising the following step:

defining deposition conditions as a function of a position of the reaction zone, seen in a longitudinal direction of the hollow glass substrate tube, for deposition of at least one glass layer, with the deposition conditions thus defined differing from each other within the deposition of the glass layer, wherein:

within a particular glass layer the refractive index value and/or the cross-sectional area of one glass layer obtained by deposition differs from the refractive index value and/or the cross-sectional area of another glass layer obtained by deposition, the defining of deposition conditions comprises setting one or more process parameters selected from the group consisting of: flow of the additional gas to be metered at the supply side, velocity of the reaction zone, intensity of the plasma of the reaction zone, and length of the reaction zone, and the number of glass layers of each glass layer package is set so that the following condition is met:

$$N \leq 0.1 * \frac{\lambda * Q_{final}}{d * Q_{fibre}}$$

where

N=the number of glass layers in a glass package [-]
$\lambda$=the minimum wavelength used of the optical fiber [μm]
d=the thickness of a glass layer in a glass layer package of a primary preform [μm]
$Q_{final}$=the diameter of the final preform produced on the basis of the primary preform [mm]
$Q_{fibre}$=the diameter of the optical fibre [mm].

2. The method according to claim 1, wherein the deposition conditions of glass layers adjacent to each other within a particular glass layer package differ from each other.

3. The method according to claim 1, wherein an average refractive index value and/or the cross-sectional area of a particular glass layer package made up of a number of individual glass layers obtained by deposition is the combination of the refractive index value and/or the cross-sectional area of each individual glass layer, with the refractive index value and/or the cross-sectional area of at least two such individual glass layers in the glass layer package differing from each other.

4. The method according to claim 1, wherein each glass layer of a respective glass layer package has a thickness, seen in radial direction, that ranges from 0.1 to 10 micrometer.

5. The method according to claim 1, wherein each glass layer of a respective glass layer package has a thickness, seen in radial direction, that ranges from 0.5 to 5 micrometer.

6. The method according to claim 1, wherein the number of glass layers in a glass layer package ranges from 2-100.

7. The method according to claim 1, wherein a deposition length, that is the length of the substrate tube along which the reaction zone is moved between the two points of reversal, is subdivided into separate deposition regions, wherein the respective deposition condition is determined for each deposition region.

8. The method according to claim 7, wherein the deposition condition determined for a deposition region is adjustable during the deposition process.

9. The method according to claim 1, wherein the amount of additional gas is supplied at the supply side of the hollow glass substrate tube in the form of one or more pulses characterised by pulse height and pulse length.

10. The method according to claim 9, wherein the pulse length ranges between 1 ms and 500 ms.

11. The method according to claim 9, wherein the pulse length ranges between 5 ms and 100 ms.

12. The method according to claim 1, wherein the additional gas is selected from the group consisting of: gases that contain one or more refractive index-increasing and/or a refractive index-decreasing dopants, and gases such as oxygen, argon and helium, or a combination of two or more thereof.

13. The method according to claim 1, wherein the dopants are selected from the group consisting of $GeCl_4$, $PO_2Cl_5$, $N_2$ $CF_4$, $SiF_4$, $C_2F_6$, $C_4F_8$, $CCl_2F_2$, $SiF_4$, $Si_2F_6$, $SF_6$, $NF_3$ and $F_2$.

14. The method according to claim 1, wherein the primary preform comprises at least one preform layer, which preform layer is at least in part built up of glass layer packages, and wherein the preform layer has a substantially constant average refractive index and/or cross-sectional area, seen in radial direction.

15. A method for manufacturing a final preform for an optical fibre, comprising the following steps:

i) manufacturing a primary preform for an optical fibre, using a plasma chemical internal vapour deposition process, wherein doped or undoped glass-forming precursors are supplied to the interior of a hollow glass substrate tube, a reaction zone in the form of a plasma is moved back and forth along the length of the hollow glass substrate tube between a point of reversal near a supply side and a point of reversal near a discharge side of the hollow substrate tube, wherein the substrate tube is positioned in a furnace and wherein such conditions are created in the reaction zone that one or more glass layer packages made up of at least two separate glass layers are deposited on the interior of the substrate tube, the method comprising the following step:

defining deposition conditions as a function of a position of the reaction zone, seen in a longitudinal direction of the hollow glass substrate tube, for deposition of at least one glass layer, with the deposition conditions thus defined differing from each other within the deposition of the glass layer, wherein:

within a particular glass layer the refractive index value and/or the cross-sectional area of one glass layer obtained by deposition differs from the refractive index value and/or the cross-sectional area of another glass layer obtained by deposition, the defining of deposition conditions comprises setting one or more process parameters selected from the group consisting of: flow of the additional gas to be metered at the supply side, velocity of the reaction zone, intensity of the plasma of the reaction zone, and length of the reaction zone, and the number of glass layers of each glass layer package is set so that the following condition is met:

$$N \leq 0.1 * \frac{\lambda * Q_{final}}{d * Q_{fibre}}$$

where
N=the number of glass layers in a glass package [-]
$\lambda$=the minimum wavelength used of the optical fiber [μm]
d=the thickness of a glass layer in a glass layer package of a primary preform [μm]
$Q_{final}$=the diameter of the final preform produced on the basis of the primary preform [mm]
$Q_{fibre}$=the diameter of the optical fibre [mm];

ii) contracting the primary preform obtained in step i) into a solid primary preform under the influence of a heat source; and iii) optionally applying an additional amount of glass to the outer side of the solid primary preform obtained in step ii) so as to form the final preform.

16. The method according to claim 15, wherein the ratio between the cross-sectional area of the additional glass layer and the cross-sectional area of the preform layers is constant along the length of the final preform.

17. The method according to claim 15, further comprising forming an optical fibre by heating one end of the final preform and subsequently drawing the heated final preform to form the optical fibre therefrom.

* * * * *

UNITED STATES PATENT AND TRADEMARK OFFICE
CERTIFICATE OF CORRECTION

PATENT NO. : 8,863,557 B2
APPLICATION NO. : 13/623182
DATED : October 21, 2014
INVENTOR(S) : Igor Milicevic et al.

It is certified that error appears in the above-identified patent and that said Letters Patent is hereby corrected as shown below:

On the title page, item (72), 3rd inventor name should read: Mattheus Jacobus Nicolaas Van Stralen Signed and Sealed this
Twenty-sixth Day of May, 2015

Michelle K. Lee
*Director of the United States Patent and Trademark Office*